United States Patent [19]

Würminghausen et al.

[11] Patent Number: 4,588,770

[45] Date of Patent: May 13, 1986

[54] POLYORGANOSILOXANE COMPOSITIONS WHICH HARDEN INTO ELASTOMERS AT ROOM TEMPERATURE

[75] Inventors: Thomas Würminghausen, Leverkusen; Franz Saykowski, Cologne; Hans Sattlegger, Odenthal, all of Fed. Rep. of Germany

[73] Assignee: Bayer Aktiengesellschaft, Leverkusen, Fed. Rep. of Germany

[21] Appl. No.: 622,946

[22] Filed: Jun. 21, 1984

[30] Foreign Application Priority Data

Jul. 2, 1983 [DE] Fed. Rep. of Germany ....... 3323911

[51] Int. Cl.$^4$ .................. C08L 83/04; C08K 3/36; C08K 5/54; C08K 3/10
[52] U.S. Cl. .................... 524/731; 524/424; 524/425; 524/493; 524/588; 524/787; 524/788; 524/847; 524/861; 524/863; 524/864; 524/865; 525/446; 528/33; 528/901
[58] Field of Search ............ 524/424, 425, 493, 731; 524/787, 788, 847, 861, 863, 864, 865, 588; 528/33, 901; 525/446

[56] References Cited

U.S. PATENT DOCUMENTS

| | | | |
|---|---|---|---|
| 3,441,534 | 4/1969 | Knaub | 525/446 |
| 3,449,465 | 6/1969 | Golitz et al. | 524/588 |
| 3,474,064 | 10/1969 | Hittmair et al. | 524/863 |
| 3,541,044 | 11/1970 | Beers et al. | 524/863 |
| 3,676,420 | 7/1972 | Fulton et al. | 524/863 |
| 3,776,977 | 12/1973 | Chadha | 525/100 |
| 3,919,438 | 11/1975 | Urkevich | 525/446 |
| 4,039,503 | 8/1977 | Itoh | 524/188 |
| 4,076,684 | 2/1978 | Wohlfarth et al. | 524/188 |
| 4,111,890 | 9/1978 | Getson et al. | 528/10 |
| 4,116,935 | 9/1978 | Kishimoto et al. | 524/588 |
| 4,191,713 | 3/1980 | Yonezawa et al. | 528/38 |
| 4,191,817 | 3/1980 | Schiller et al. | 528/43 |
| 4,465,712 | 8/1984 | McVie | 525/446 |
| 4,472,465 | 9/1984 | Burrill | 525/446 |

FOREIGN PATENT DOCUMENTS 2413441 7/1979 France .

OTHER PUBLICATIONS

Chemical Abstracts, vol. 83, 1975, p. 71, No. 165530z.

*Primary Examiner*—Herbert J. Lilling
*Attorney, Agent, or Firm*—Sprung Horn Kramer & Woods

[57] ABSTRACT

A silicone composition which is stable in the absence of moisture but which in the presence of water will cure at room temperature to an elastomer, comprising a polyorganosiloxane having reactive end groups, a polyester and a thickening filler.

9 Claims, No Drawings

POLYORGANOSILOXANE COMPOSITIONS WHICH HARDEN INTO ELASTOMERS AT ROOM TEMPERATURE

The present invention relates to polyorganosiloxane compositions which, on access of moisture from the air, harden into an elastomer, which essentially consist of polydiorganosiloxanes having reactive terminal groups, hydrolyzable silicon compounds which, in total have more than two hydrolyzable groups, an optionally modified polyester, an agent for rendering the composition non-flowing and, if necessary, further constituents, such as fillers, adhesives, catalysts, pigments, antioxidants, or α,ω-triorganosiloxy-terminated polydiorganosiloxanes, and which are prepared by thorough mixing.

On vulcanization the compositions according to the invention turn into materials which are distinguished by particularly favorable mechanical properties and an attractive surface gloss.

The compositions according to the invention can be stored for a prolonged period at room temperature in watertight vessels and are crosslinkable outside such vessels by water or atmospheric moisture, i.e. without mixing in a further compound.

These compositions harden in the course of prolonged periods from the outside towards the inside and are referred to below as 1 K-RTV pastes. If desired, the composition can, however, be modified into a deliberately accelerately hardening system by stirring in a further component which contains water in dissolved or dispersed form.

These 1 K-RTV compositions are fundamentally different from the so-called 2 K-RTV compositions which completely harden in thick layers within a very short time after mixing the constituents and are usually used as molding compositions. These systems too can be prepared in accordance with this invention.

1 K-RTV pastes have already been known for some time (cf. for example German Auslegeschriften (German Published Specifications) Nos. 1,120,690, 1,223,546, 1,224,039 and 1,247,646, and W. Noll. Chemie und Technologie der Silicone [Chemistry and Technology of Silicones], Verlag Chemie, Weinheim, 1968) and have become remarkably widely established. However, in respect of the many different scopes the pastes described all have some sort of disadvantage in the application or in the production, so that those who sell these products try to develop specific systems for the specific requirement profiles and, for example, to prepare them in completely transparent, oil-resistant or, particularly desirably, less expensive form, to make them firmly adherent to all the various substrates, or to effect lower adhesion to some specific substrates.

Thus, for example, other liquid polymers, in addition to polydiorganosiloxanes, have been used in attempts to achieve these abovementioned aims, such as, for example, silicone resins (U.S. patent specification No. 3,382,205), block copolymers of polyethers and siloxane for easier introduction of the catalyst into a 2 K-RTV system (U.S. Pat. No. 3,324,058). U.S. Pat. No. 4,261,758 describes the use of polyethers in low amounts for rendering 1 K-RTV pastes non-flowing, and German Offenlegungsschrift (German Published Specification) No. 2,007,002 describes the preparation of 1 K-RTV pastes from polydiorganosiloxane having reactive terminal groups, nitrogen-containing silane crosslinking agents and the additional use of polyethers and derived therefrom, the use of organopolysiloxane-polyoxyalkylene copolymers for the same purpose.

Instead of using liquid polymers attempts have been made to modify the application properties of 1 K-RTV pastes by incorporating pulverulent polymer particles, for example by using PVC (German Offenlegungsschrift (German Published Specification) No. 2,044,684), polyacrylonitrile (U.S. Pat. No. 3,497,570) or polyethylene powder (German Offenlegungsschrift (German Published Specification) No. 2,720,534). German Offenlegungsschrift (German Published Specification) No. 2,855,192 describes the use of PVC plastisols.

It has now been found, surprisingly, that, under certain conditions, there is a simple way of obtaining previously undescribed 1 K-RTV pastes, namely by including in the mixture optionally modified polyesters.

The preparation and use of silicone-polyester copolymers is known (cf. likewise: W. Noll, Chemie und Technologie der Silicone [Chemistry and Technology of Silicones], Verlag Chemie, Weinheim, 1968), but not in the area of 1 K-RTV silicone pastes which harden into an elastomer in the presence of moisture.

It is normally expected that shortly after the mixing of different liquid polymers the phases segregate.

It has now been found, surprisingly, that a stable polydiorganosiloxane-polyester mixture is obtained if these components, and in addition a further component of the type customarily used for non-flowing sealing joint compositions, for example pyrogenic silica or very finely divided dolomite or precipitated chalk, are also mixed in.

The polyesters for the compositions according to the invention are prepared in a known manner by esterifying or transesterifying mixtures or aliphatic or aromatic dicarboxylic acid, its anhydrides or esters and aliphatic dialcohols (cf. Ullmann, Enzyklopädie der technischen Chemie [Encyclopaedia of Industrial Chemistry], Volume 14, Urban und Schwarzenberg, Munich, 1963). The dicarboxylic acids used are preferably adipic, sebacic, terephthalic, phthalic, isophthalic, maleic, fumaric and itaconic acids, and the polyhydric alcohols used are preferably ethylene glycol, propane-1,2-diol, propane-1,3-diol, butane-1,3- and -1,4-diol, hexane-1,6-diol, 2,2-dimethylpropane-1,3-diol, polyethylene glycols, polypropylene glycols or polyhydric alcohols which contain 2–7 ether groups in the molecule (cf. German Auslegeschrift (German Published Specification) No. 1,054,620). The viscosity can be regulated by means of an etherification reaction in the presence of a suitable alcohol, such as, for example, isodecanol.

Branched polyesters are prepared with higher-functional carboxylic acids or alcohols, of which may be mentioned: glycerol, 1,1,1-trimethylolpropane, hexanetriol and pentaerithrytol (cf. German Patent Specification No. 1,105,160 and German Auslegeschrift (German Published Specification) No. 1,029,147).

If desired, it is also possible to use specific polyesters which have been prepared by polymerizing lactones or copolymerizing lactones or by copolymerizing epoxides with cyclic anhydrides (cf. Hamann, Makromol Chem. 51 (1962), 53 and R. F. Fischer, J. Poly. Sci 44 (1960), 155).

Suitable polyesters, for the purposes of the invention, are also polycarbonates or co-ester polycarbonates. These polyesters can be used alone or mixed with other polyesters or polyethers.

The molecular weights of these polyesters are between 600 and 10,000, preferably between 800 and 4,000, and the OH values are between less than 1 and 80, preferably between less than 1 and 45.

It has been found, surprisingly, that the shelf life of these compositions can be improved still further if, separately from the other constituents of a RTV silicone paste, the polyester component is modified by a preliminary reaction before the mixing in.

This preferred embodiment can be realized by various measures; for example by carbonylating the polyester with carboxylic anhydride, for example with acetic anhydride, urethanating with isocyanates, for example cyclohexylisocyanate, hexamethylene-1,6-diisocyanate or toluenesulphonyl isocyanate, or silylating with hydrolytically labile silanes. Other modifications, for example etherifications, are of course also possible.

Thus, for example, stirring in the stoichiometric amount of an isocyanate produces after some time a visually unchanged product which, together with the conventional components of a 1 K-RTV paste, gives a stable formulation. Depending on the reactivity of the isocyanate used, it is advantageous to use higher temperatures and/or a catalyst, such as, for example, dibutyltin dilaurate or an amine.

Optionally modified polyesters of this type are used in amounts of 1 to 55% by weight, preferably 10 to 45% by weight, and in particular in amounts of 25-35% by weight, relative to the weight of the finished paste.

It is furthermore a preferred measure to mix the polyester with at least about stoichiometric amounts of hydrolytically labile silane at room temperature or slightly elevated temperatures and thereby to obtain reaction products which can be mixed in as an additional component in the preparation of stable 1 K-RTV pastes. The term hydrolytically labile silanes is to be understood as meaning here not only silicon compounds having three and/or four hydrolyzable groups or mixtures of these compounds (referred to in the literature as silane cross-linking agents) but also mixtures of monofunctional and/or difunctional with trifunctional and/or tetrafunctional silicon compounds which, in total, carry more than two hydrolyzable groups. In these compounds, a silicon-containing molecule can perfectly well contain different hydrolytically labile leaving groups, or, as a result of inadequate exclusion of water, the silicon compounds can have turned into their partial hydrolysis products. Suitable silicon compounds are alkoxysilanes, acyloxysilanes, amidosilanes, ketoximsilanes, alkenyloxysilanes, aminoxysilanes, aminosilanes, hexamethyldisilazane or mixed-substituted silanes, such as, for example, methylalkoxyamidosilanes, oximoaminosilanes or alkoxyalkenyloxysilanes. Instead of these or similar silicon compounds described in the patent literature, it is also possible to use in the reaction their precursers, such as, for example, $CH_3Si(OC_2H_5)_2Cl$. Apart from the hydrolyzable groups in the silicon compounds, the groupings connected via Si-C bonds can also be, apart from alkyl and aryl groups, alkenyl groups having amine, amide, carboxyl, methacrylic, epoxy, mercapto or isocyanate functions.

If the polyester-silylation reaction is carried out with a sufficient excess of silane crosslinking agents, it may also be possible in the formulation of the paste to dispense with the otherwise customary addition of a silane crosslinking agent, so that the otherwise necessary installation of an additional storage tank for the preparation of 1 K-RTV pastes can be dispensed with.

Because they are so readily available, $\alpha,\omega$-dihydroxypolydimethylsiloxanes having a viscosity of about 100 mPa.s to about $10^6$ mPa.s are used in the preparation of the 1 K-RTV pastes as polydiorganosiloxanes having reactive terminal groups. Instead of the methyl-containing polymers it is also possible to use those in which at least some of the methyl groups have been replaced by vinyl, phenyl, longer-chain alkyl or haloalkyl groups. These polymers should be essentially linear, although small proportions of branching monoorganosiloxy units can be present.

The hydroxyl groups of the polymers can be replaced by other hydrolytically detachable terminal groups, such as, for example, by alkoxy, alkoxyalkenyloxy or acyloxy groups, Si-bonded hydrogen atoms or amine, amide or hydroxylamine groups.

If the optionally modified polyesters to be admixed have not been reacted with an amount of silane crosslinking agent sufficient also to cover the vulcanization reaction, a crosslinking agent must be added in the course of preparing the paste in order to ensure that the vulcanization reaction of the pastes according to the invention takes place on access of moisture.

Crosslinking agents are here understood as meaning silanes having at least three hydrolytically labile leaving groups or a mixture of silanes having in total more than two hydrolytically labile leaving groups, which leaving groups are identical to or different from one another. Candidates are, for example, methylacetoxysilanes, ethylacetoxysilane, vinylacetoxysilanes, cyclohexylaminomethyltriethoxysilane, mixtures of amidosilanes, aminosilanes and alkoxysilanes, methyldiacetamidoethoxysilane, methyldiisopropenoxyethoxysilane, cyclic or linear siloxanes having a plurality of aminooxy leaving groups, or dimethyldiacetamidosilane with methyldiacetamidoethoxysilane.

In line with the desired formulation, these substances are thoroughly mixed in the absence of moisture with a filler having a thixotropic effect, such as pyrogenic silica milled dolomite or very finely divided chalk, until the result is, as desired, a non-flowing paste (DIN No. 52,454) or a free-flowing composition, either of which is then packed in water-tight storage vessels. Pastes thus prepared have a long shelf life in the absence of moisture and do not segregate into a polysiloxane phase and a polyester phase. The following are possible further constituents, in addition to the $\alpha,\omega$-dihydroxypolydimethylsiloxane and the optionally modified polyester, for preparing the formulation according to the invention: catalysts such as dibutyltin diacetate, UV absorbers, fungicides, anti-ageing agents, perfume oils, plasticizers, such as $\alpha,\omega$-trimethylsiloxypolydimethylsiloxanes, polybutenes, solvents such as cyclohexane, paraffin hydrocarbons, alkylaromatics, mineral or organic pulverulent fillers, such as chalk, polyethylene powder, pigments, drying agents, such as hydrolysis-sensitive titanium compounds, adhesives, such as dibutoxydiacetoxysilane or $\epsilon$-glycidopropyltriethoxysilane. The individual constituents of the pastes according to the invention are used in amounts which are customary for systems of this type.

The following examples are intended to illustrate the preparation of the pastes according to the invention and their properties. The pastes are in all cases prepared in planetary mixers, but it is also possible to use other customarily used machines; the viscosity data is for measurements at 25° C.

EXAMPLE 1

64.6 g of α,ω-dihydroxypolydimethylsiloxane having a viscosity of 50,000 mPa.s, 25 g of a polyester having an OH value of 8.8 and a viscosity of 1200 mPa.s and prepared from phthalic acid, hexane-1,6-diol and isodecanol, 4.0 g of ethyltriacetoxysilane, 0.9 g of tetraethoxysilane, 5.5 g of pyrogenic silica (BET surface area: 110 m$^2$/g) and 0.01 g of dibutyltin diacetate are thoroughly stirred in a planetary mixer. The result is a stable white paste having an attractive, shiny surface.

A 2 mm thick test specimen is stored for 7 days in air to produce a vulcanizate having the following mechanical data:
Shore A hardness: 12
Modulus of 100% elasticity: 0.14 [MPa]
Elongation at break: 417%
Tensile strength: 0.34 [MPa]

EXAMPLE 2

(Comparison)

64.6 g of an α,ω-dihydroxypolydimethylsiloxane having a viscosity of 50,000 mPa.s are mixed with 25 g of a polyester having an OH value of 54. This polyester has been prepared by reacting adipic acid with diethylene glycol. 4.0 g of ethyltriacetoxysilane, 0.9 g of tetraethoxysilane, 5.5 g of pyrogenic silica having an average BET surface area of 100 m$^2$/g and 0.01 g of dibutyltin diacetate are also added. The paste thus prepared has become stiff in as short a time as about two hours and cannot be removed from the storage vessel any longer.

EXAMPLE 3

The polyester of Example 2 is reacted at 130° C. with an excess of acetic anhydride for three hours, and the mixture is then degassed at 150° C. for two hours. 34.2 g of the resulting material having an OH value of <1 are mixed with 36.9 g of α,ω-dihydroxypolydimethylsiloxane having a viscosity of 50,000 mPa.s, 14.5 g of α,ω-trimethylsiloxypolydimethylsiloxane having a viscosity of 1,000 mPa.s, 4.0 g of ethyltriacetoxysilane, 0.9 g of dibutoxydiacetoxysilane, 5.5 g of pyrogenic silica having an average BET surface area of 100 m$^2$/g and 0.01 g of dibutyltin diacetate. The non-flowing storage stable paste obtained produces on vulcanization a material having the following mechanical properties (measured after 7 days):
Shore A hardness: 13
Modulus of 100% elasticity: 0.17 [MPa]
Elongation at break: 640%
Tensile strength: 0.63 [MPa]

EXAMPLE 4

The polyester of Example 2 is heated in toluene together with an excess of cyclohexyl isocyanate at 130° C. for 3 hours, and the mixture is put under vacuum at this temperature for 2 hours to remove the volatiles. The reaction product has an OH value of 0.5. 60.2 g of α,ω-dihydroxypolydimethylsiloxane having a viscosity of 50,000 mPa.s, 4.5 g of diisobutoxytitanium-bis(ethylacetoacetat), 5.5 g of pyrogenic silica having an average BET surface area of 110 m$^2$/g, 0.7 g of dibutyltin dilaurate and 4.0 g of methyldi-N-methylbenzamidoethoxysilane are mixed into 25 g of the above modified polyester. The non-flowing paste vulcanizes into a silicone rubber which produces the following mechanical values after seven days:
Shore A hardness: 14
Modulus of 100% elasticity: 0.16 [MPa]
Elongation at break: 723%
Tensile strength: 0.81 [MPa]

EXAMPLE 5

64.6 g of α,ω-dihydroxypolydimethylsiloxane having a viscosity of 50,000 mPa.s are mixed with 25 g of a polyester having an average molecular weight of 2,000, prepared from butanediol and ethylene glycol (ratio 30:70) and adipic acid and modified with acetic anhydride as described in Example 3. 4.0 g of ethyltriacetoxysilane, 0.9 g of tetraethoxysilane, 5.5 g of pyrogenic silica having an average surface area of 110 m$^2$/g and 0.01 g of dibutyltin diacetate are also incorporated. The non-flowing paste vulcanizes into a silicone rubber which gives the following values after 7 days:
Shore A hardness: 21
Modulus of 100% elasticity: 0.42 [MPa]
Elongation at break: 425%
Tensile strength: 1.15 [MPa]

EXAMPLE 6

64.6 g of α,ω-dihydroxypolydimethylsiloxane having a viscosity of 50,000 mPa.s are mixed in a planetary mixer with 29.0 g of a polyester of adipic acid and butanediol/ethylene glycol (ratio 3:7) having an average molecular weight of 4,000 and an OH value of 28 and having been reacted, separately from the other constituents, in a 1½ hour preliminary reaction at 50° C. with ethyltriacetoxysilane in a ratio of 1 to 0.16, 0.9 g of tetraethoxysilane, 5.5 g pyrogenic silica having an average BET surface area of 110 m$^2$/g and 0.01 g of dibutyltin diacetate. The non-flowing paste has the following mechanical data 7 days after the start of the vulcanization.
Shore A hardness: 22
Modulus of 100% elasticity: 0.39 [MPa]
Elongation at break: 424%
Tensile strength: 1.28 [MPa]

EXAMPLE 7

64.6 g of α,ω-dihydroxypolydimethylsiloxane having a viscosity of 50,000 mPa.s are mixed with 33.1 g of the polyester of Example 2 which has beforehand been reacted at 50° C. for 1½ hours in a separate preliminary reaction in a ratio of 1:0.32 with methyltriisobutanoneoxime silane, and 5.5 g of pyrogenic silica having an average BET surface area of 110 m$^2$/g and 0.05 g of dibutyltin acetate are also stirred into the planetary mixer. The non-flowing paste has the following mechanical values 7 days after the start of the vulcanization:
Shore A hardness: 23
Modulus of 100% elasticity: 0.41 [MPa]
Elongation at break: 474%
Tensile strength: 1.46 [MPa]

EXAMPLE 8

64.6 g of α,ω-dihydroxypolydimethylsiloxane having a viscosity of 50,000 mPa.s are mixed with 25 g of the polyester of Example 2 which has beforehand been heated at 100° C. for one hour with hexamethyldisilazane in a ratio of 1:0.077. The four last-mentioned constituents of Example 3 are also added, in the amounts given there. The silicone rubber has the following mechanical values 7 days after the start of the vulcanization reaction:

Shore A hardness: 13
Modulus of 100% elasticity: 0.21 [MPa]
Elongation at break: 437%
Tensile strength: 0.51 [MPa]

EXAMPLE 9

35 g of α,ω-dihydroxypolydimethylsiloxane having a viscosity of 50,000 mPa.s are mixed with 20 g of the polyester modified as in Example 4, 4.0 g of diisobutoxytitanium-bis(ethylacetoacetat), 30 g of chalk coated with stearic acid, 5.0 g of pyrogenic silica having an average BET surface area of 150 m$^2$/g, 0.7 g of dibutyltin dilaurate and 4.0 g of methyldi-N-methylbenzamidoethoxysilane. A sample each of the brushed-out paste is coated after 24 hours and 48 hours with a covering alkyd-based paint and a filmforming glaze. The flow is good. The adhesion of the coatings is assessed in accordance with the Boeing test, which is equivalent to ASTM D No. 3359-70, and is found to be 100%.

The non-flowing paste produces, 7 days after the start of the vulcanization, a rubber having the following mechanical data:
Shore A hardness: 27
Modulus of 100% elasticity: 0.37 (MPa)
Elongation at break: 554%
Tensile strength: 0.8 (MPa)

EXAMPLE 10

646 g of α,ω-dihydroxypolydimethylsiloxane having a viscosity of 50,000 mPa.s are mixed with 45 g of the diisobutoxytitanium-bis(ethylacetoacetat), 55 g of pyrogenic silica having an average BET surface area of 110 m$^2$/g, 7 g of dibutyltin dilaurate and 342 g of the reaction product of the polyester described in Example 2 with methyldi-N-methylbenzamidosilane. This reaction product is prepared beforehand, separately from the other products, by heating the two components at 50° C. for 1½ hours in a ratio of 1:0.37. A sample of the paste vulcanizes in air into a material which after 7 days is found to have the following values:
Shore A hardness: 21
Modulus of 100% elasticity: 0.28 [MPa]
Elongation at break: 407%
Tensile strength: 0.92 [MPa]

EXAMPLE 11

60.0 g of α,ω-dihydroxypolydimethylsiloxane having a viscosity of 50,000 mPa.s are intimately mixed with 39.3 g of the polyester of Example 4 and 3.9 g of dimethyldibutylaminosilane. To this mixture are added 90 g of chalk coated with stearic acid and having an average particle size of less than 0.1 μm and 25 g of α,ω-triorganosiloxypolydimethylsiloxane having a viscosity of 100 mPa.s. After thorough homogenization of the constituents, 9 g of methyltributylaminosilane are stirred in.

The non-flowing paste vulcanizes into a silicone rubber which is found after seven days to have the following mechanical values:
Shore A: 26
Modulus of 100% elasticity: 0.39 [MPa]
Elongation at break: 573%
Tensile strength: 0.94 [MPa]

EXAMPLE 12

64.6 g of α,ω-dihydroxypolydimethylsiloxane having a viscosity of 50,000 mPa.s are mixed with 25 g of the polyester modified as in Example 4, 7.0 g of pyrogenic silica having an average BET surface area of 150 m$^2$/g and 4 g of methyltri-n-butylaminosilane.

A sample of the paste produced, 7 days after access of moisture, a material having the following mechanical data:
Shore A: 24
Modulus of 100% elasticity: 0.47 [MPa]
Elongation at break: 495%
Tensile strength: 1.42 [MPa]

EXAMPLE 13

The polyester corresponding to Example 2 is heated together with ethyltriacetoxysilane in the ratio of 1 to 0.25 at 50° C. for 90 minutes.

31.2 g of this product, 64.6 g of α,ω-dihydroxypolydimethylsiloxane having a viscosity of 50,000 mPa.s, 0.9 g of tetraethoxysilane, 5.5 g of pyrogenic silica having an average BET surface area of 110 m$^2$/g and 0.01 g of dibutyltin acetate are thoroughly mixed with one another. The paste vulcanizes into an elastomer having the values, measured after 14 days, shown in Table 1.

EXAMPLE 14

61.5 g of α,ω-dihydroxypolydimethylsiloxane having a viscosity of 50,000 mPa.s are thoroughly mixed with 24.1 g of α,ω-trimethylsiloxypolydimethylsiloxane having a viscosity of 1,000 mPa.s, 4.0 g of ethyltriacetoxysilane, 0.9 g of dibutoxydiacetoxysilane, 9.5 g of pyrogenic silica having an average BET surface area of 150 m$^2$/g and 0.01 g of dibutyltin diacetate. After hardening for 14 days the elastomer has the values as given in Table 1.

Samples of the elastomers of Examples 13 and 14 are stored at 150° C. in ASTM-3 oil for 70 hours. The elastomer corresponding to Example 14 is destroyed in this time. The elastomer according to Example 13 is measured and found to have the values listed in Table 1:

TABLE 1

|  | Example | | ASTM-3 oil 70 hours/150° C. | |
| --- | --- | --- | --- | --- |
|  | 13 | 14 | 13 | 14 |
| Shore A hardness | 17 | 22 | 11 | — |
| Modulus of 100% elasticity [MPa] | 0.22 | 0.4 | 0.28 | — |
| Elongation at break % | 480 | 600 | 460 | — |
| Tensile strength [MPa] | 0.71 | 1.40 | 0.66 | — |

EXAMPLE 15

90 g of α,ω-dihydroxypolydimethylsiloxane of a viscosity of 50,000 mPa.s are mixed with 15 g of α,ω-trimethylsiloxypolydimethylsiloxane of a viscosity of 1,000 mPa.s, 45 g of a polyester according to Example 1 and 150 g of a dolomite (average particle diameter: 20 μm) according to Example 11. A mixture of 3.0 g of methyltrimethoxysilane, 0.9 g of ethylpolysilicate (content of SiO$_2$: 40% by weight) and 0.15 g of dibutyltindiacetate is stirred into this paste.

The composition vulcanizes into a silicone rubber having the following mechanical properties, measured after one day:
Shore A hardness: 20
Modulus of 100% elasticity: 0.13 [MPa]
Elongation at break: 468%
Tensile strength: 0.33 [MPa]

EXAMPLE 16

90 g of α,ω-dihydroxypolydimethylsiloxane having a viscosity of 50,000 mPa.s are mixed with 15 g of α,ω-trimethylsiloxypolydimethylsiloxane having a viscosity of 1,000 mPa.s, 45 g of polyester corresponding to Example 1, 3.0 g of an α,ω-dihydroxypolydimethylsiloxane having a viscosity of 90 mPa.s and 135 g of a chalk corresponding to Example 11. Into this paste is stirred a mixture of 3.0 g of methyltriethoxysilane, 0.9 g of ethyl polysilicate (silicate content: 40% by weight) and 1.2 g of dibutyltin dilaurate. The composition vulcanizes into a silicone rubber which after one day is found to have the following mechanical properties:

Shore A hardness: 20
Modulus of 100% elasticity: 0.33 [MPa]
Elongation at break: 734%
Tensile strength: 1.25 [MPa]

It will be appreciated that the instant specification and examples are set forth by way of illustration and not limitation, and that various modifications and changes may be made without departing from the spirit and scope of the present invention.

We claim:

1. A room temperature hardenable polyorganosiloxane composition comprising a polyorganosiloxane containing reactive end groups, a polyester wherein the number of hydroxyl groups of said polyester have been reduced by carboxylation, urethanation, etherfication and/or silylation, and a thickening filler.

2. The polyorganosiloxane composition of claim 1 which further contains a condensation catalyst.

3. The polyorganosiloxane composition of claim 1 wherein the hydroxyl groups of said polyester are silylated by reaction of said polyester with a hydrolyzable silane.

4. The polyorganosiloxane composition of claim 2 wherein the hydroxyl groups of said polyester are silylated by reaction of said polyester with a hydrolyzable silane.

5. The polyorganosiloxane of claim 1 wherein the average molecular weight of said polyester is between 600 and 10,000.

6. The polyorganosiloxane composition of claim 1 wherein the thickening filler is pyrogenic silica or very finely divided precipitated chalk.

7. The polyorganosiloxane composition of claim 2 wherein the thickening filler is pyrogenic silica or very finely divided precipitated chalk.

8. The polyorganosiloxane composition of claim 1 which further contains a silicon compound containing more than two hydrolyzable groups.

9. The polyorganosiloxane of claim 8 wherein said hydrolyzable silane is an acyloxysilane.

* * * * *

UNITED STATES PATENT AND TRADEMARK OFFICE
CERTIFICATE OF CORRECTION

PATENT NO. : 4,588,770

DATED : May 13, 1986

INVENTOR(S) : Thomas Würminghausen, et al.

It is certified that error appears in the above-identified patent and that said Letters Patent is hereby corrected as shown below:

Title Page, under "U.S. Patent Documents", line 2     Delete "Golitz" and substitute --Gölitz--

Col. 4, line 69     Insert --*All the physical properties listed are determined in accordance with DIN 53,504 or DIN 53,505--

Signed and Sealed this

Second Day of December, 1986

Attest:

DONALD J. QUIGG

Attesting Officer     Commissioner of Patents and Trademarks